United States Patent
Kurronen

[15] 3,645,282
[45] Feb. 29, 1972

[54] SONIC CARWASH SYSTEM AND APPARATUS

[72] Inventor: George K. Kurronen, Colorado Springs, Colo.

[73] Assignee: Sonar International, Inc., Colorado Springs, Colo.

[22] Filed: July 22, 1970

[21] Appl. No.: 57,111

[52] U.S. Cl. ............................134/45, 134/57 R, 134/172
[51] Int. Cl. ..........................................................B60s 3/04
[58] Field of Search............................134/45, 57 R, 123, 172

[56] References Cited

UNITED STATES PATENTS

| | | | |
|---|---|---|---|
| 2,676,600 | 4/1954 | Vani et al. | 134/123 |
| 3,481,346 | 12/1969 | McBurnett | 134/45 |
| 3,498,302 | 3/1970 | Null | 134/57 R X |
| 3,533,422 | 10/1970 | Alimanestiano | 134/45 |

Primary Examiner—Robert L. Bleutge
Attorney—Wilkinson, Mawhinney & Theibault

[57] ABSTRACT

The present disclosure is directed to a carwash system in which a boom is installed centrally on the ceiling of a vehicle wash bay and a tractor unit moves a carrier back and forth on the boom. The carrier supports a vertical and horizontal wash means each of which may be moved independently toward or away from the carrier to compensate for varying sizes of vehicles. The carrier has a swivel mounting between itself and the tractor for rotating the carrier in a horizontal plane. The vertical and horizontal wash means each have sonic transducers for establishing a sonar beam between the two means which will be broken by the presence and made by the absence of a vehicle in the wash bay beneath the boom. The sonic beam controls relay circuits for sequentially energizing and driving the tractor unit and the swivel drive on the carrier to move the wash means about the vehicle.

7 Claims, 6 Drawing Figures

INVENTOR
GEORGE K. KURRONEN

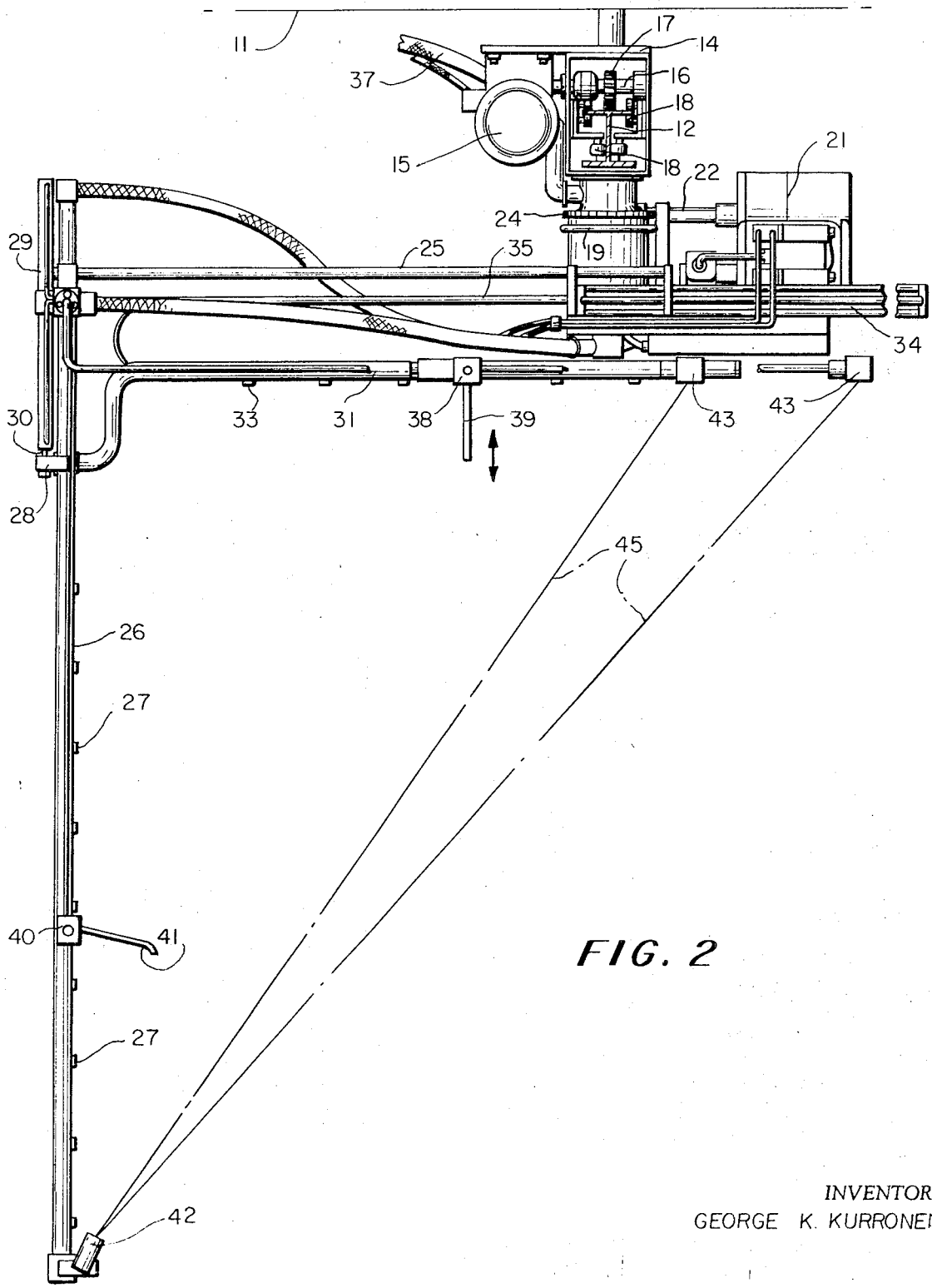

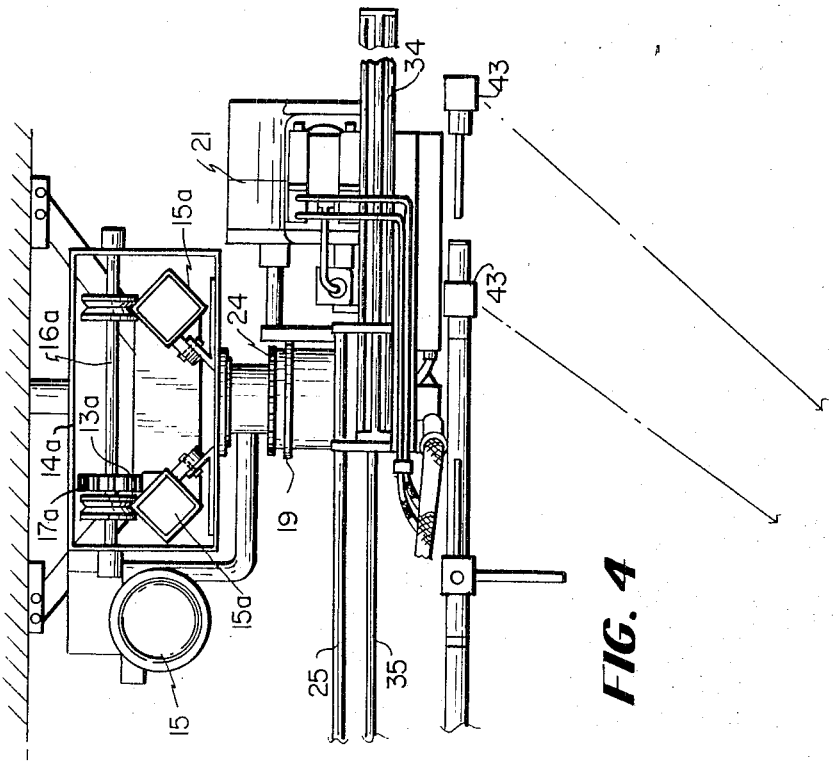
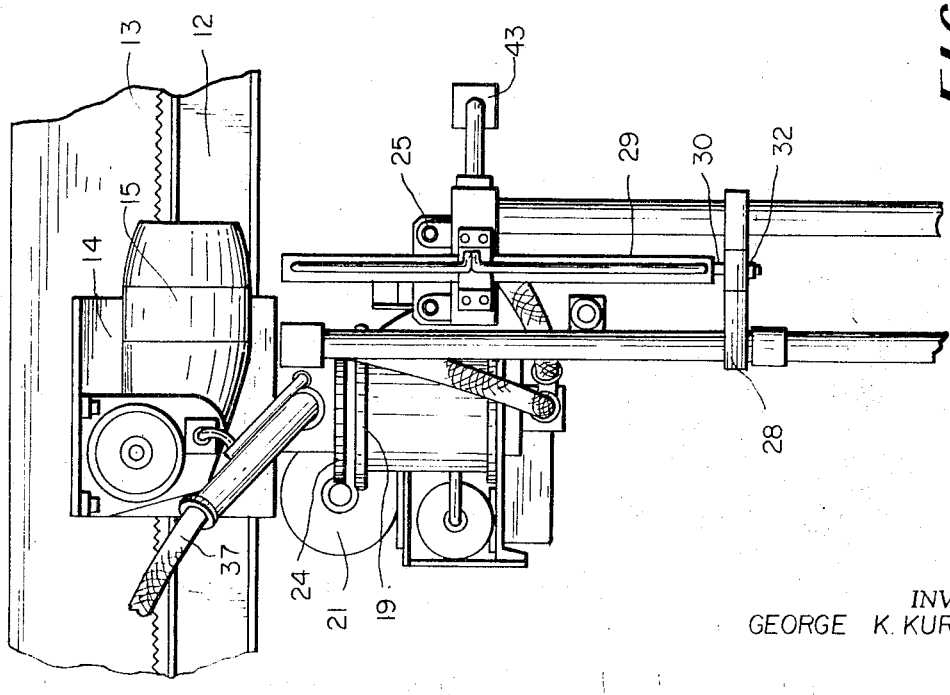

SONIC CARWASH SYSTEM AND APPARATUS

An object of the present invention is the provision of a sonic car wash system and apparatus wherein pairs of spaced-apart sonic transducers, one of each pair carried by a vertical wash means and the other of each pair carried by a horizontal wash means control the sequential driving of an overhead boom mounted tractor unit having a swivelly mounted carrier which supports the vertical and horizontal wash means and wherein a swivel drive motor is also in circuit to be controlled by the making and breaking of the sonic beam to cause the two wash means to move about the ends of the vehicle.

Another object of the present invention is the provision of a transient or false signal delay control in circuit with the tractor and swivel motors so they do not cause the wash means to swivel before clearing the vehicle which would result in damage to both the vehicle and wash apparatus upon fortuitous making or breaking of the sonic beam due to resonant echos within or outside of the wash bay.

A further object of the present invention is the provision of a system which is fully automatic for adjusting itself to any size vehicle and moving about the vehicle without making physical contact therewith except upon making its initial setting as to height of the horizontal wash means above the top of the vehicle and side space distance of the vertical wash means from the side of the vehicle and the ends thereof to assure proper water pressure against the vehicle during all phases of application of detergent wash and rinse without the necessity of placing tracks on the floor which enclose the vehicle to be washed.

With the foregoing and other objects in view, the invention will be more fully described hereinafter, and will be more particularly pointed out in the claims appended hereto.

In the drawings, wherein like symbols refer to like or corresponding parts throughout the several views:

FIG. 2 is an end elevational view of the apparatus of FIGURE 1.

FIG. 3 is an enlarged side elevational view of the carrier, wash means and tractor mounted on the boom track.

FIG. 4 is an enlarged end elevational view of a modified form of boom and track for supporting the tractor and carrier.

Figure 1:
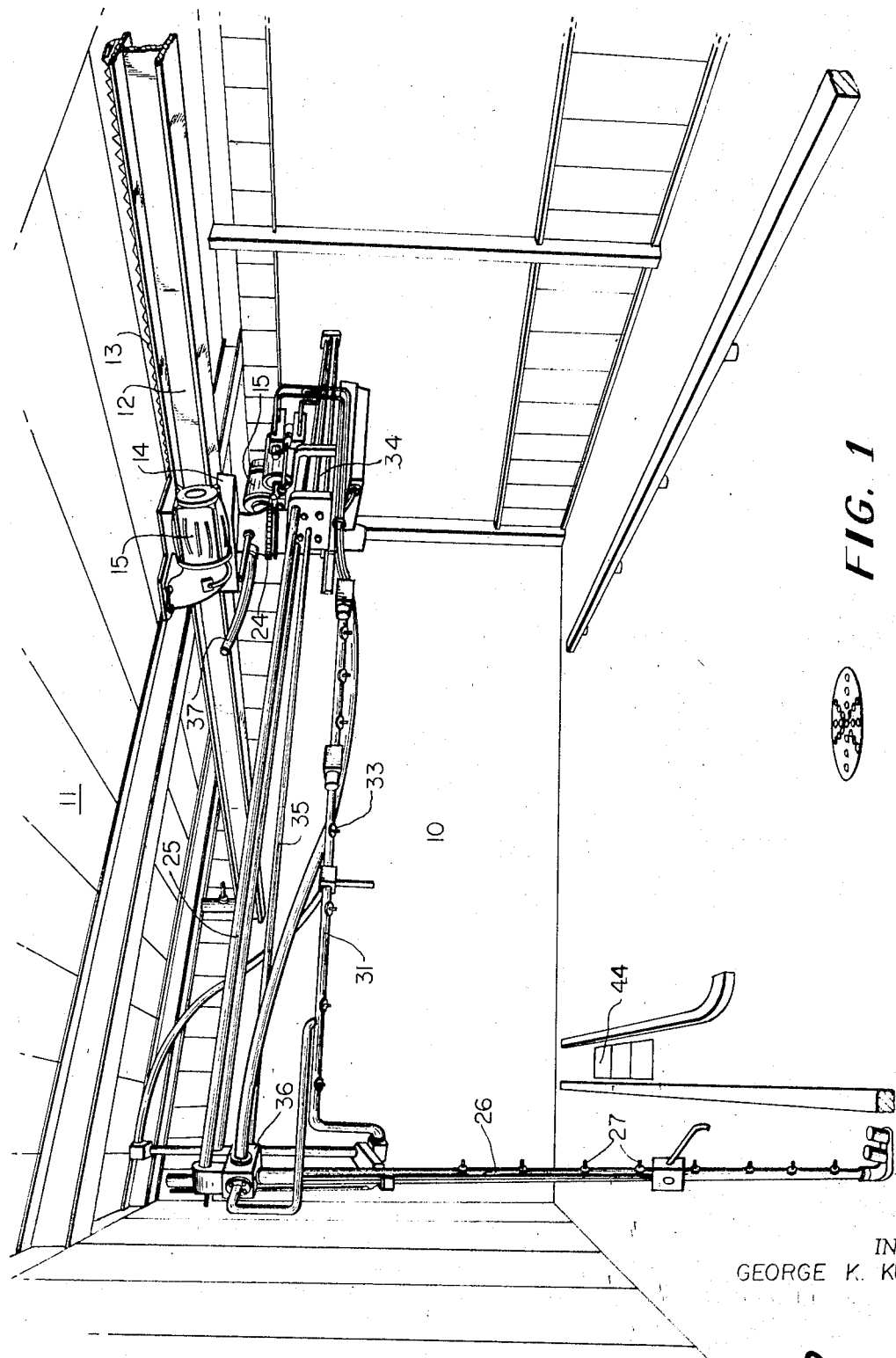
FIG. 1 is a perspective view of a vehicle wash bay having the apparatus of the present invention installed therein.
Figure 5:
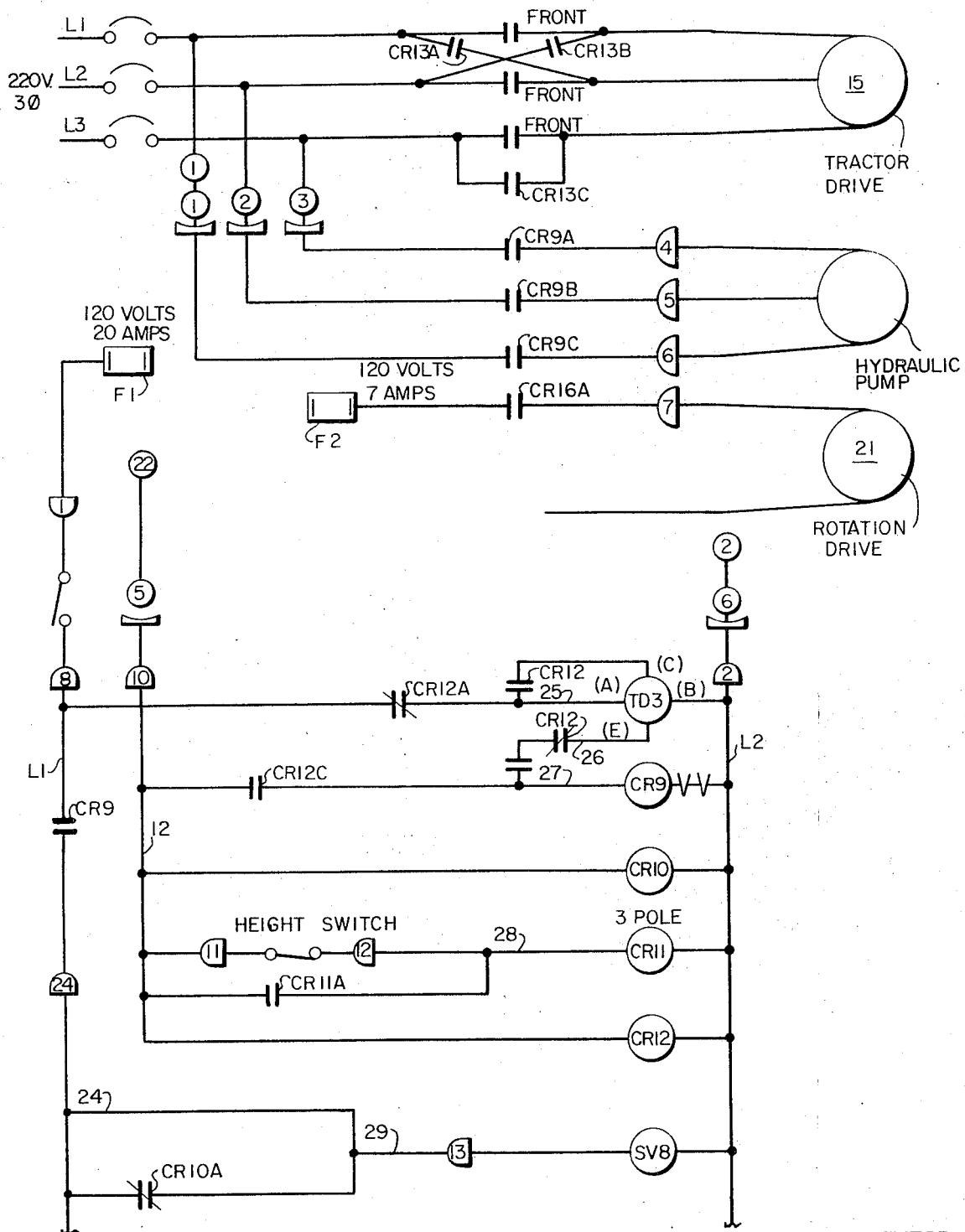
FIGURES 5 and 6 are electrical schematics of the system and apparatus of FIGURES 1 through 4.
Figure 6:
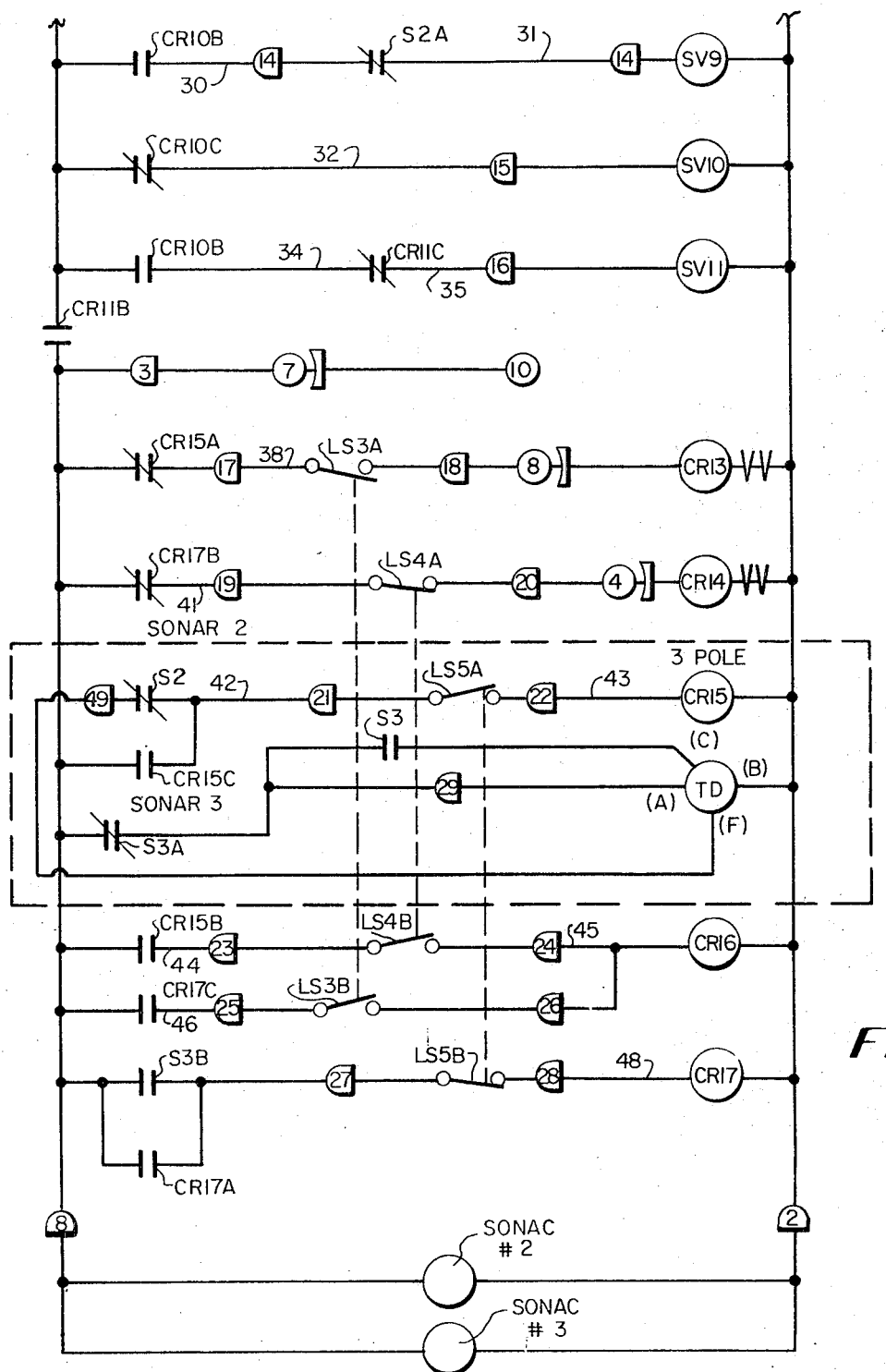

Referring now to the drawings 10 designates a vehicle wash stall or bay having a ceiling 11 upon which is mounted a central overhead track means or boom 12 having a toothed gear rack 13 secured thereto, mounted upon and for movement there along is a tractor means 14 having a motor 15, driving shaft 16 to which is secured for rotation therewith a pinion 17 which is in mesh with the teeth of rack gear 13 for positive drive along the track or boom 12. The tractor unit 14 has stabilizing guide rollers 18 to maintain a stabilized solid physical contact between the boom 12 and tractor 14. Beneath the tractor 14 is a horizontally disposed swivel mount 19 to which is secured for rotation a carrier unit 20, which carries a swivel motor 21 having an output shaft 22 to which is secured a worm gear 23 which is in mesh with a worm ring gear 24 secured to the tractor means for compelling rotation of the carrier 20 about the tractor 14.

The carrier 20 has horizontal guides 25 extending laterally therefrom and as best seen in FIGURE 2 these guides 25 support the vertical wash means 26 which is a hollow tube having a plurality of nozzles 27 there along. The tube 26 is mounted in guides 28 for movement up and down relative thereto under the control of cylinder 29 secured at one end to guides 25 and a ram 30 secured to the horizontal wash means 31 as at 32. This controls the up and down movement of the horizontal wash means 31 which is also of hollow tubular construction having nozzles 33 there along.

The movement of the vertical wash means 26 toward and away from the track or boom 11 is controlled by a cylinder 34 secured to the carrier 20 and a ram 35 the free end of which is secured to the vertical wash means 26 as at 36. This is to compensate for cars of varying width to maintain a wash pressure at the point of contact of the wash stream against the car sufficient to do the wash job.

The wash or liquid sprayed against the vehicle comes through a fluid line 37 under pressure from the conventional system of pressurized detergents, rinse and wash water, hot and cold units known to this art and not forming a part of this invention.

The up and down movement of the horizontal wash means 31 is under the control of a limit switch 38 having a wand 39 which will engage the top of a car and open the switch 38 which is in a solenoid control circuit to actuate hydraulic cylinder and ram 29, 30 to stop the horizontal wash means the proper distance from the vehicle top to assure the wash fluid issuing from the nozzles 33 is at proper cleaning pressure.

The movement of the vertical wash means 26 toward or away from the side of the vehicle in the wash bay may be controlled by a limit switch 40 having a wand 41 which will engage the side of the vehicle and actuate a solenoid valve in the hydraulic circuit which causes cylinder 34 to stop ram 35 when the wand 41 has engaged the vehicle.

When the wash cycle has been completed and the vehicle is ready to move out of the bay the vertical and horizontal wash means return to their origin position which will accommodate the largest vehicle to be accepted by the system. Carried at the base of the vertical wash means 26 are a pair of sonic transducers 42 which operate on a frequency range of from 38,000 kc. to 41,000 kc. in cycles per second and are the first sonic means in the claims. Sonic transducers 43 are carried on the horizontal wash means 31 and placed in sonic sight of the transducers 42. The units 43 are identical to the units 42 and when a sonic beam passes between the units 42, 43 no car is in the bay 10.

When a vehicle enters the bay 10 the sonic beam is broken and the relay controlled thereby is opened. The front wheel of the vehicle actuates a treadle switch 44 which opens the solenoid to permit a detergent solution under pressure to pass from the supply units (not shown) through line 37 and thence through the vertical wash means 26 and the horizontal wash means 31 and be emitted from the nozzles 27 and 33 against the car. The motor 15 is energized driving the tractor unit 14 and its entrained carrier 20 which carries the vertical and horizontal wash means 26 and 31 along the left side of the vehicle until the unit passes the rear bumper and the sonic beam 45 is established closing a relay which opens the supply to tractor motor 15 which arrests fore and aft travel of the tractor means 14. At this time a relay closes energizing the circuit to the swivel motor 21 causing shaft 22 driving worm gear 23 in mesh with worm ring 24 to rotate the carrier 20 about the swivel 19 causing the vertical and horizontal wash means to move through 180° traversing the rear of the vehicle and presenting itself to the right side of the vehicle at which time LS5A is opened and the sonic beam 45 is broken opening the relay which will cause the tractor motor 15 to be energized to move the carrier and the wash means from the rear of the vehicle to the front. When the vertical and horizontal wash means have cleared the front of the vehicle and the sonic beam 45 is once again established the control relay closes stopping the tractor motor 15 and simultaneously energizing the swivel motor 21 causing the carrier 20 and wash means 26, 31 to rotate 180° to traverse the front of the vehicle until LS5B is opened and the beam 45 is once again broken which will deenergize the swivel motor 21 and energize the tractor motor 15 to move the unit to the origin position or to continue around the vehicle in whatever the programmed cycle may be such as three times around with detergent and wash water and three times around with rinse water.

When working with a sonic beam 45 the establishment of the beam closes a relay which will put a timer in the circuit so that should reflections momentarily cause a false indication that the unit was clear of the front or rear of the vehicle, when in fact it was not, the swivel motor 21 would not be energized which would cause the vertical wash means to engage the side of the vehicle resulting in damage to both the vehicle and the swivel drive system as well as the wash means. The relay will resist false signals for a predetermined time period, it being a time relay whose setting may be varied. When a sufficient time period has elapsed which will assure that the unit has cleared the vehicle the normal operation described above will take place, this is to protect against sonic reflections from outside sources which are really transients of short duration causing a malfunction of the unit.

As shown in Figure 4, the wash unit may be supported on a modified hanger unit which employs two rectangular tubular supports 15a, one of which carries gear rack 13a which is in mesh with pinion 17 driven by motor 15. This form of track support for the tractor unit and carrier gives greater lateral support for the unit.

When the car to be washed is positioned in bay 10, relays CR10 and CR12 operate allowing the hydraulic pump to start and energizing solenoids 9 and 11 to bring the horizontal wash means 31 down and the vertical wash means 26 in. As the horizontal wash means sensor 38, 39 touches the car top, relay CR11 is energized which allows the tractor drive to move the booms 26, 31 towards the rear of the car. The tractor linestarter for rearward motion also energizes a timer that prevents sonics 42 and 43 from causing boom rotation should their sonic paths 45 be made at the start. The booms 26, 31 progress rearward until sonic paths 45 are made. When sonic paths 45 makes, a timer starts and when the time expires relay CR15 energizes allowing the rotation linestarter to rotate the booms 26, 31 180°. After the 180° rotation at the rear of the car the tractor linestarter for forward boom motion is energized allowing the booms to progress to the front of the car, where sonic paths 45 again makes, the timer starts and when the timer expires the rotation linestarter energizes allowing the booms to rotate another 180°. The boom functions of rearward travel, rear of car rotation, forward travel and front of car rotation are repeated for the predetermined program. When the car wash program is completed a timer is started that allows the hydraulic pump to run thus restoring the booms to the start position.

What is claimed is:
1. A sonic-controlled carwash comprising
 a. a central overhead track means adapted to be placed in a wash stall along the centerline of vehicles to be washed.
 b. carrier means mounted for back-and-forth movement along said track means,
 c. vertical wash means carried by said carrier means,
 d. horizontal wash means mounted for vertical movement on said vertical wash means,
 e. means connected between said vertical wash means and said carrier means for moving said vertical wash means toward and away from said carrier means,
 f. means connected between said vertical wash means connection to said carrier and said horizontal wash means for moving said horizontal wash means toward and away from said carrier means,
 g. tractor means on said carrier means connected to drive said carrier means back and forth along said track means,
 h. swivel drive means on said carrier means connected to rotate said carrier means horizontally below said tractor means,
 i. a first sonic means carried by said vertical wash means proximate its base and being in circuit with said tractor means and swivel drive means,
 j. a second sonic means carried proximate the free end of said horizontal wash means and being in circuit with said tractor means and said swivel drive means so that a sonic beam is established between said first and second sonic means when no vehicle is in the wash stall and the system is not operative but which will be broken when a vehicle is in the stall causing the tractor to move the vertical and horizontal wash means along one side and the top of the vehicle until they clear the vehicle at which time the beam is reestablished causing the tractor means to stop and the swivel drive means to rotate the vertical and horizontal wash means 180° breaking the sonic beam stopping horizontal rotation and energizing the tractor means to move the vertical and horizontal wash means along the opposite side of the vehicle until the front is reached reestablishing the sonic beam which stops the tractor means and energizes the swivel drive means which moves the vertical and horizontal wash means about the front of the car returning to the origin point of the wash cycle.

2. A sonic-controlled car wash as claimed in claim 1 further comprising limit switch means carried by each of said vertical and horizontal wash means and being in circuit to actuate moving each vertical and horizontal wash means for moving same toward or away from said carrier means to compensate for vehicles of varying height and width.

3. A sonic-controlled car wash as claimed in claim 1 wherein said vertical wash means and said horizontal wash means are combined in a substantially inverted L-shaped member.

4. A sonic-controlled car wash as claimed in claim 1 wherein said carrier means includes a motor which drives a pinion in mesh with a gear rack carried by said overhead track means.

5. A sonic-controlled car wash as claimed in claim 1 wherein said swivel drive means is a motor driving a worm in mesh with a worm ring gear which will cause said carrier to rotate in a horizontal plane beneath said tractor means.

6. A sonic-controlled car wash as claimed in claim 1 further comprising sonic transient damping means in circuit with said first and second sonic means to delay response to making and breaking of the sonic beam for a predetermined interval until said vertical and horizontal wash means have actually cleared the terminal length of the vehicle being washed.

7. A sonic-controlled car wash as claimed in claim 1 wherein said means for moving both of said wash means toward or away from the carrier means are hydraulic cylinders and rams in fluid circuits controlled by limit switches.

* * * * *